(12) United States Patent
Bazan Bejarano

(10) Patent No.: US 7,526,640 B2
(45) Date of Patent: Apr. 28, 2009

(54) SYSTEM AND METHOD FOR AUTOMATIC NEGOTIATION OF A SECURITY PROTOCOL

(75) Inventor: Dario Bazan Bejarano, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/608,334

(22) Filed: Jun. 30, 2003

(65) Prior Publication Data

US 2004/0268118 A1 Dec. 30, 2004

(51) Int. Cl.
*H04L 9/00* (2006.01)
*G06K 19/00* (2006.01)
*G06F 15/16* (2006.01)

(52) U.S. Cl. .................. 713/151; 713/150; 713/152; 726/10; 109/233

(58) Field of Classification Search ......... 713/189–201, 713/184, 150, 151, 152; 380/21, 9, 25; 726/10; 709/233
See application file for complete search history.

(56) References Cited

U.S. PATENT DOCUMENTS

| | | | | |
|---|---|---|---|---|
| 5,008,879 | A | * | 4/1991 | Fischer et al. ............... 370/401 |
| 5,010,572 | A | * | 4/1991 | Bathrick et al. ............. 713/162 |
| 5,204,961 | A | * | 4/1993 | Barlow .......................... 726/1 |
| 5,530,703 | A | * | 6/1996 | Liu et al. ..................... 370/255 |
| 5,530,758 | A | * | 6/1996 | Marino et al. ................ 713/150 |
| 5,828,893 | A | * | 10/1998 | Wied et al. .................. 709/229 |
| 5,913,024 | A | * | 6/1999 | Green et al. .................... 726/3 |
| 6,125,122 | A | | 9/2000 | Favichia et al. |
| 6,205,148 | B1 | * | 3/2001 | Takahashi et al. ........... 370/401 |
| 6,216,231 | B1 | * | 4/2001 | Stubblebine .................. 726/10 |
| 6,845,452 | B1 | * | 1/2005 | Roddy et al. ................. 726/11 |
| 6,871,284 | B2 | * | 3/2005 | Cooper et al. .................. 726/1 |
| 6,934,702 | B2 | * | 8/2005 | Faybishenko et al. .......... 707/3 |
| 7,050,457 | B2 | * | 5/2006 | Erfurt ......................... 370/467 |
| 7,069,437 | B2 | * | 6/2006 | Williams ..................... 713/166 |
| 2002/0078371 | A1 | * | 6/2002 | Heilig et al. ................ 713/200 |
| 2002/0157019 | A1 | * | 10/2002 | Kadyk et al. ................ 713/201 |

FOREIGN PATENT DOCUMENTS

EP 622710 A2 * 11/1994
WO WO 99/38081 7/1999

* cited by examiner

*Primary Examiner*—Nasser G Moazzami
*Assistant Examiner*—Mohammad W Reza
(74) *Attorney, Agent, or Firm*—Shook, Hardy & Bacon, L.L.P.

(57) ABSTRACT

A protocol negotiation platform permits a computer or other node lying outside of a security-enabled domain to negotiate a supported security protocol with a server or other node within that domain. Active Directory™, Kerberos and other secure network technologies permit agents or nodes within a domain to communicate securely with each other, using default, protocols and key, certificate or other authentication techniques. In the past external agents however had no transparent way to enter the domain, requiring the manual selection of protocols for use across the domain boundary. According to the invention either of an external agent or an internal agent may initiate an attempt to establish a secure session across the domain boundary, transmitting a request including a set of supported protocols to the recipient machine. A negotiation engine may then compare the available protocols on both of the agents, nodes or machines at either end of the session, and select a compatible protocol when found. The internal and external agents may likewise authenticate each other using a key, certificate or other mechanism.

44 Claims, 4 Drawing Sheets

SYSTEM AND METHOD FOR AUTOMATIC NEGOTIATION OF A SECURITY PROTOCOL

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of networked computing, and more particularly to the automatic negotiation of security protocols between a security-enabled domain and one or more external nodes.

BACKGROUND OF THE INVENTION

Advances in networking technology have permitted network administrators and others to maintain greater and more sophisticated security controls on their networks and other installations. Microsoft Windows™ NT, 2000 and related products for instance permit administrators to deploy security-enabled network domains using the Active Directory™ (AD) structure. The publicly known Kerberos network standard likewise permits nodes within a network to authenticate each other, using a key/authentication platform. With these operating technologies, a network administrator may be able, for instance, to push rules, applications, patches, drives and other resources from a network server to individual workstations or other clients for uniform installation, on a secure basis. All machines within the security-enabled domain may be able to identify and authenticate the transmission of those and other types of data, transparently.

However, the ability to deliver rules, applications or other resources to and from a workstation becomes more difficult when that node lies outside the security-enabled domain. For instance, a company may have a collection of computers located on a local area network (LAN) but also interact with computers in a remote location which are not part of the Active Directory™ or other security-enabled domain. Communicating across the boundary of a secure domain becomes more complicated, in part because establishing a connection between a machine internal to the domain a machine outside the domain requires that an agreement be reached on a mutually supported security protocol.

Systems administrators and others are therefore forced to attempt to arrange for the entry of an external agent or node into the security-enable domain by identifying a compatible protocol between the internal and external machines, before the session takes place. For instance, an external node may be configured to communicate via a transport layer security (TLS) protocol, a Kerberos-based protocol, a secure socket layer (SSL) or other protocol with an administrative server within the security-enabled domain. That machine may in turn may in that protocol its default protocol, indicate a protocol failure, request that the protocol be switched, or make other responses to the external node or agent. Manual setting or adjusting of the security, transport and other protocols may therefore be required, a process which may be time consuming and prone to error. Other problems exist.

SUMMARY OF THE INVENTION

The invention overcoming these and other problems in the art relates in one regard to a system and method for automatic negotiation of a security protocol, in which secure communications with an external agent or node may be established and identities authenticated, on an automated basis without a need for administrator intervention. According to the invention in one regard, a network manager or other agent or node within a security-enabled domain may initiate an attempt to establish a secure connection with an external agent or node. That request may contain a data field indicating a set of security protocols available for use by the manager. The external agent may receive the request and compare the protocols available to the internal agent or manager to a set of protocols supported by the external agent. If a match between available protocols is found, communications may proceed based on that selected protocol. In embodiments, each of the external agent and internal agent may authenticate each other, via a key, certificate, or other authentication mechanism.

DETAILED DESCRIPTION OF EMBODIMENTS

Figure 1:
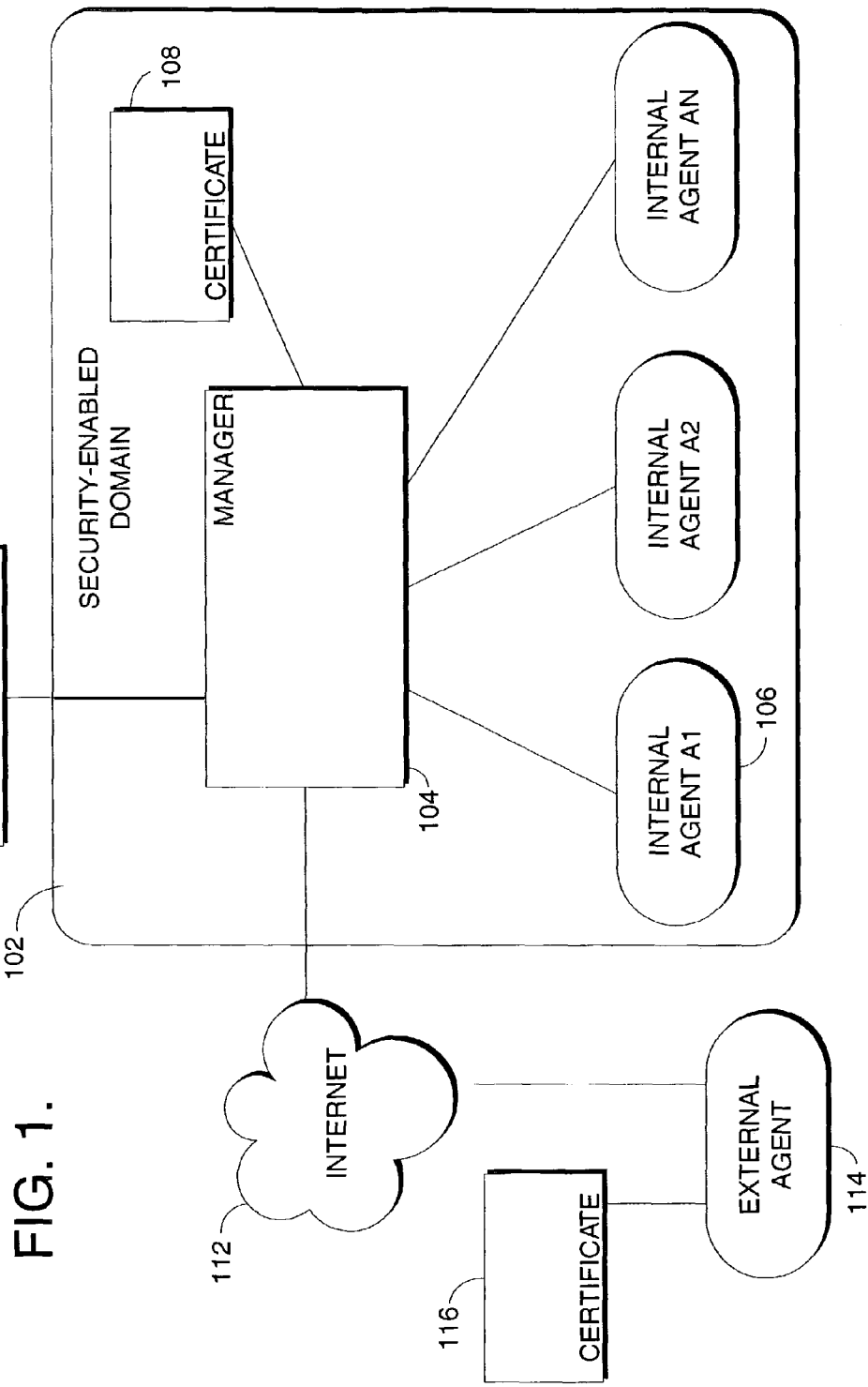
FIG. 1 illustrates a network architecture in which an embodiment of the invention may operate.

FIG. 1 illustrates an architecture in which a protocol negotiation platform and method may operate, according to an embodiment of the invention. As illustrated, in the illustrated embodiment a set of clients, servers, agents or other nodes or machines may operate in a security-enabled domain 102. Security-enabled domain may in embodiments be or include, for instance, Microsoft Windows™ Active Directory™, a Kerberos or other certificate-based or key-based domain, or other closed or secure distributed directory or other environment. Illustratively shown within security-enabled domain are an internal manager 104, which in embodiments may be or include a server or other node, as well as a set of internal agents 106 (illustrated as A1, A2 . . . AN, N arbitrary).

In embodiments the set of internal agents 106 may consist of or include additional servers, workstations or other clients, or other internal agents or nodes operating within the security-enabled domain 102 and communicating with internal manager 104. In embodiments the internal manager 104 may schedule or perform network administrative functions, such as transmitting or "pushing" network rules or other data to the set of internal agents 106, such as operating guidelines for storage (e.g. RAID policies, failover criteria, memory limits), bandwidth utilization or other rules or data. When communicating these or other types of data, the internal manager 104 and set of internal agents 106 may take advantage of the security resources of security-enabled domain to ensure the integrity of the network and the distribution of rules and other data.

As illustrated, in embodiments the security-enabled domain 102 may provide authentication services, for instance using certificates such as certificate 108, which may in embodiments be or include as a certificate configured according to X.509 or other standards or formats. In embodiments keys or other mechanisms may likewise be used. As illustrated, certificate 108 may be associated with and provide authentication data for the internal manager 104. Any one of the set of internal agents 106 may authenticate the rules, instructions or other data received from the internal manager 104 by communicating certificate 108 to a certificate authority 110 for verification. Certificate authority 110 may itself be located within security-enabled domain 102, or as illustrated be located outside the security-enabled domain 102.

In embodiments, the certificate authority 110 may be or include a server or other node configured to read and decode certificate 108 or other authentication mechanisms, and return results to the set of internal agents 106 or other nodes. Each of the nodes in the set of internal agents 106 may likewise have associated with them a certificate, key or other authentication data compatible with the security-enabled domain 102. Nodes in the set of internal agents 106 may likewise communicate with and mutually authenticate each other, using certificate or other mechanisms.

In the embodiment illustrated in FIG. 1, an external agent 114 may likewise be configured to communicate with internal manager 104 via communications network 112. The external agent 114 may also be or include a server, workstation or other node or resource. The external agent 114 may likewise have associated with it a certificate 116 identifying the external agent 114 for authentication. The communications network 112 through which external agent 114 may communicate with internal manager 104 or other internal nodes in embodiments may be, include or interface to any one or more of, for instance, the Internet, an intranet, a local area network (LAN), a wide area network (WAN), a metropolitan area network (MAN), a storage area network (SAN), a frame relay connection, an Advanced Intelligent Network (AIN) connection, a synchronous optical network (SONET) connection, a digital T1, T3, E1 or E3 line, Digital Data Service (DDS) connection, an ATM (Asynchronous Transfer Mode) connection, an FDDI (Fiber Distributed Data Interface), CDDI (Copper Distributed Data Interface) or other wired, wireless or optical connection. The external agent 114 may in embodiments be or include a workstation, server, wireless network-enabled device, or other node, agent or platform configured for networked communications.

Unlike prior implementations of cross-domain communication, according to embodiments of the invention the external agent 114 may initiate contact with the internal manager 104 to establish a secure connection based on a mutually compatible protocol with manually selecting a compatible protocol, in an automatic and transparent fashion. As illustrated for instance in FIG. 2, an external application 130 executing on external agent 114 may initiate contact with internal manager 104 via external negotiation engine 126. External application 130 may be or include a systems utility, productivity or other application, such as, for instance, a data backup scheduler, a firewall, virus protection or other application. External application 130 may for example require user profiles, updates or other data to perform various tasks and therefore initiate such communication with internal manager 104.

The external negotiation engine 126 may process and manage the communication requested by the external application 130, to establish a mutually compatible communications link to the internal manager 104 in security-enabled domain 102.

As illustrated, in embodiments the external negotiation engine 126 may initiate and manage a negotiation module 118, illustrated as an implementation of the publicly known Simple and Protected GSS-API Negotiation (SPNEGO) protocol. Other protocols may be used. In embodiments, negotiation module 118 may be accessed, initiated or generated via an operating system of external agent 114, for instance via an application programming interface (API) or other mechanisms.

Figure 2:
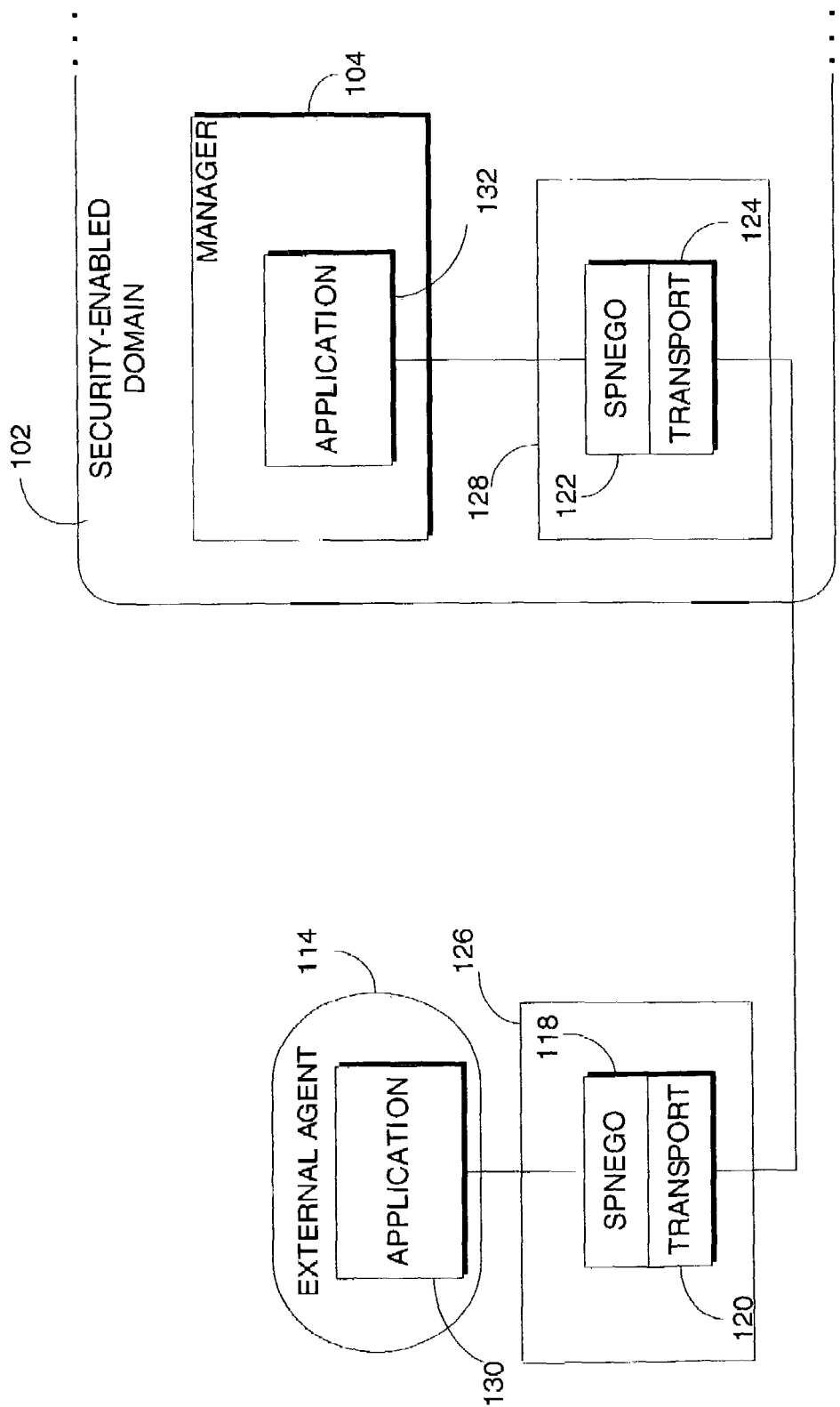
FIG. 2 illustrates a negotiation process between an internal node and an external node, according to an embodiment of the invention.

The external negotiation engine 126 may likewise include or generate an external transport specifier 120 indicating a message-based or other channel which external agent 114 may employ to execute the protocol negotiation process. For instance, in embodiments the external transport specifier 120 may specify a Security Support Provider Interface (SSPI) protocol, as part of the Microsoft .NET architecture, permitting external application 130 or other software or modules to access for instance dynamic link libraries (dlls) or other resources supporting standard cryptographic or other encoding schemes. Other protocols may be used or specified in external transport specifier 120. The external negotiation engine 126 may consequently communicate a datagram indicating that or other data to an internal negotiation engine 128 associated with internal manager 104, as illustrated in FIG. 2.

Internal negotiation engine 128 may likewise include or interface to a negotiation module 122 and internal transport specifier 124. Internal negotiation engine 128 may in turn communicate with an internal application 132 executing on or accessed by internal manager 104. Internal application 132 may, for example, be or include a systems administration, productivity or other application. Upon receipt of a request to establish communication with the internal manager 104, the internal negotiation engine 128 may establish a message-based or other channel with external agent 114 via internal transport specifier 124, for instance confirming channel communications using the SSPI protocol.

Figure 3:
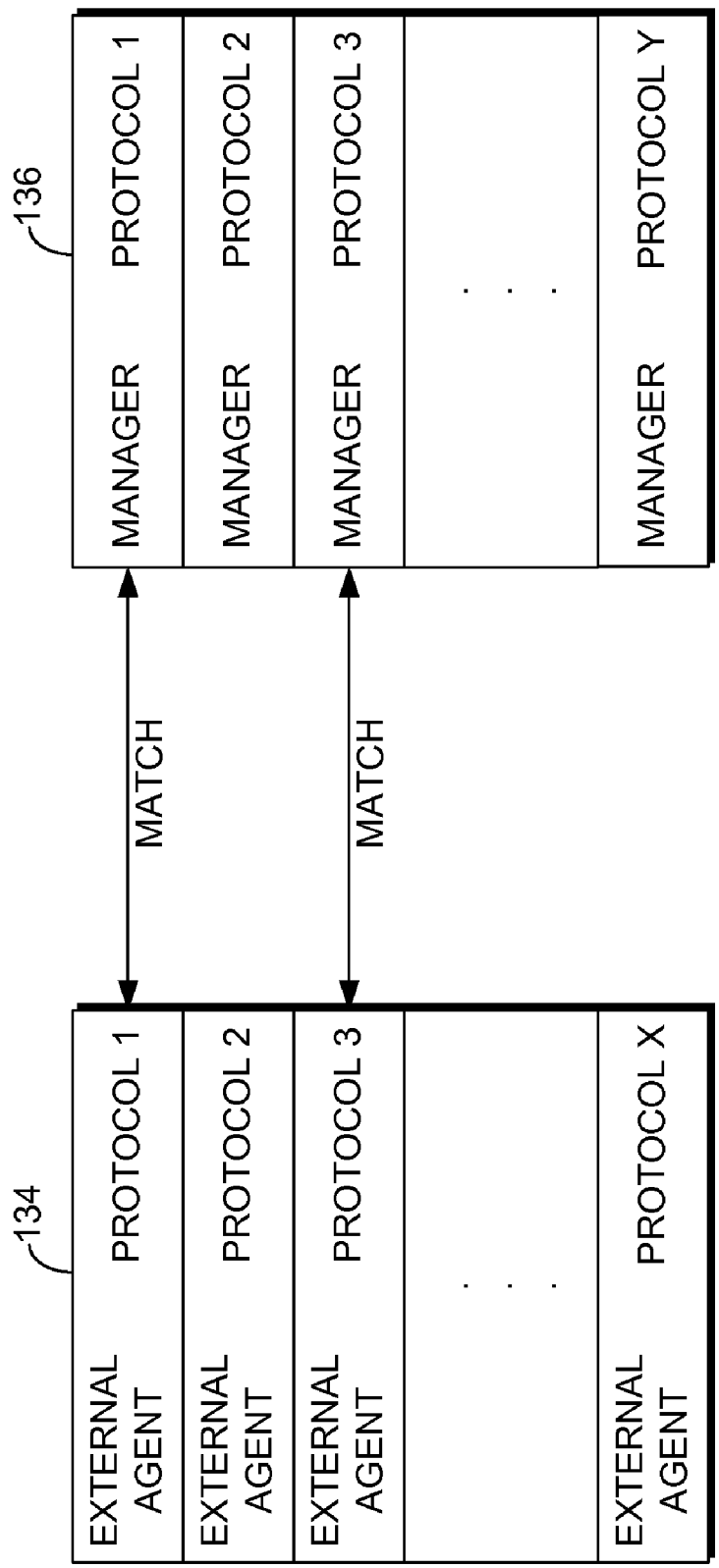
FIG. 3 illustrates a comparison between protocol tables, according to an embodiment of the invention.

With a preliminary channel established between external agent 114 and the internal manager 104, the external negotiation engine 126 and internal negotiation engine 128 may initiate protocol negotiation and reduction. In embodiments, the external agent 114 may transmit an external protocol table 134 as illustrated in FIG. 3 to the internal manager 104. The external protocol table 134 may specify which protocols external agent 114 may be configured to use. When received by the internal manager 104, the external protocol table 134 may be compared to an internal protocol table 136, indicating a set of security protocols available for use by internal manager 104. Either one of external protocol table 134 and internal protocol table 136 may include fields indicating, for example, transport layer security (TLS), secure socket layer (SSL), Kerberos, secure IP (IPSec) or other available protocols or standards. The negotiation engine 128 associated with the internal manager 104 may identify one or more protocols mutually supported by external agent 114 and internal manager 104, as illustrated in FIG. 3.

Negotiation engine 128 may in embodiments likewise communicate internal protocol table 136 to the negotiation engine 126 associated with external agent 114, for similar protocol comparison. Negotiation engine 126 and negotiation engine 128 may consequently negotiate the selection of a mutually available protocol to establish secure communications across security-enabled domain. For instance, if only a single common protocol is available to both external agent and internal manager 104, the external agent 114 and the internal manager 104 may agree to set up a session using that protocol, such as TLS or another protocol. If the negotiation engine 126 and negotiation engine 128 agree that no common protocol may be found, the attempt to establish cross-domain communications may be terminated. Conversely, if the negotiation engine 126 and negotiation engine 128 identify multiple protocols in common, a protocol may be selected based on network criteria, such as transfer speed, bit depth of keys or other security mechanisms, or other factors.

With a mutually compatible protocol in place, a secure session between external agent 114 and internal manager 104 may be established. In embodiments, for added security each of external agent 114 and internal manager may likewise perform authentication steps to verify the identity, privilege level or other security details of the opposite node. As illustrated in FIG. 1, this may be performed using certificates or other security mechanisms. External agent 114 may authenticate internal manager 104 by communicating certificate 108 to certificate authority 110. Internal manager 104 may conversely authenticate external agent 114 by communicating certificate 116 to certificate authority 110. Other security mechanisms may be used.

The type or content of data exchanged between the external agent 114 and internal manager 104 may in embodiments depend on the mutual authentication between the two nodes. For instance, access to network administrative rules or parameters may be reserved for internal or external nodes only indicating a given level of access privilege. Other authentication rules or criteria may be used. After the operational security protocol has been established and any authentication processing is complete, the external agent 114 and internal manager 104 may exchange data, applications, rules or other information. When the traffic is complete, negotiation engine 126 and negotiation engine 128 may release. or terminate the communications link.

Figure 4:
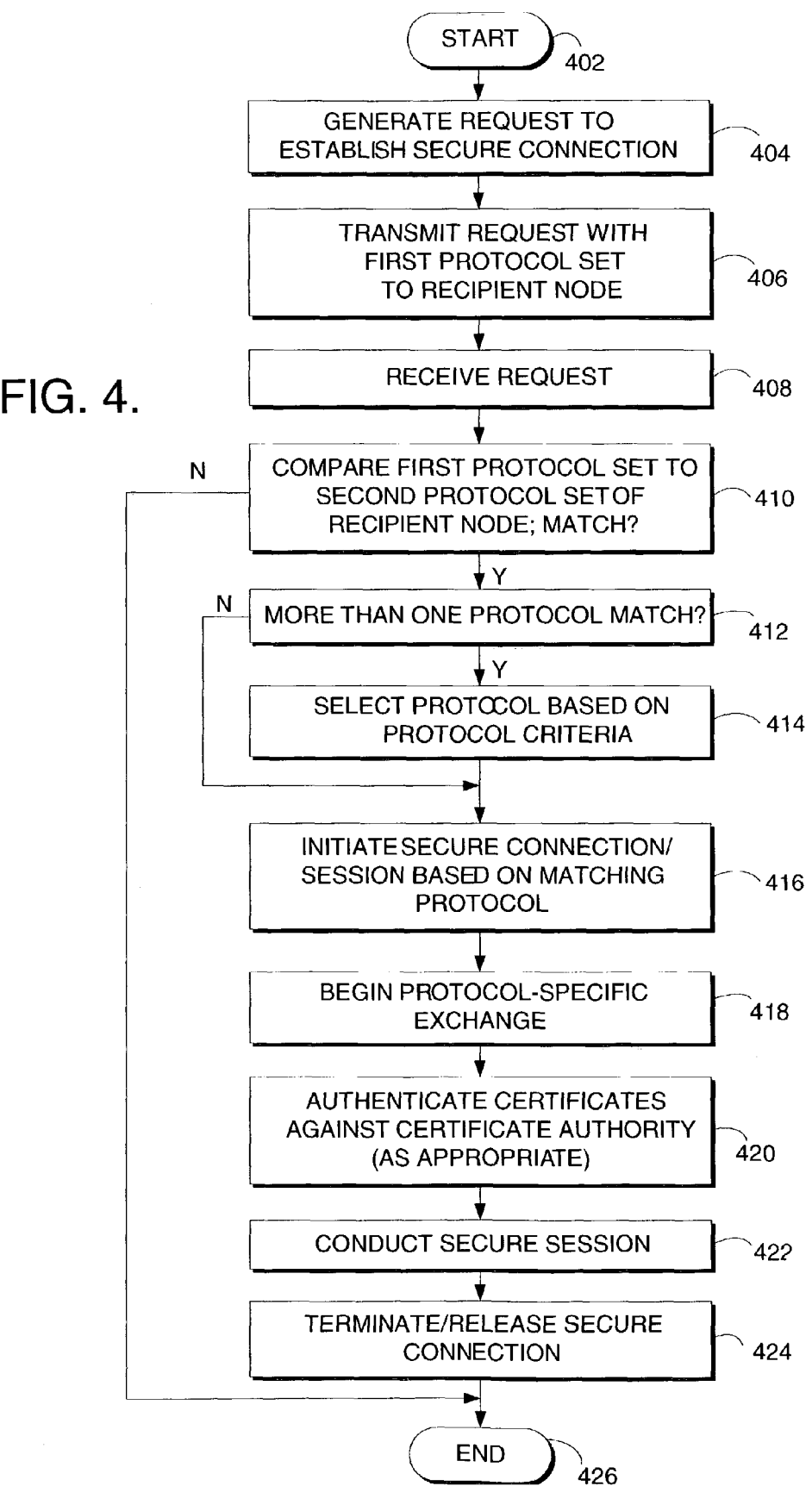
FIG. 4 illustrates overall protocol negotiation processing, according to an embodiment of the invention.

Overall network negotiation processing according to an embodiment of the invention is illustrated in FIG. 4. In step 402, processing may begin. In step 404, a request to establish a secure connection across the security-enabled network 102 may be generated in either of external agent 114, internal manager 104 or other clients, agents or nodes. In step 406, the request to establish a secure connection may be transmitted to the recipient node, whether internal manager 104, external agent 114 or another client, agent or node, the request incorporating a first protocol set compatible with the transmitting node. In step 408, the request may be received by the recipient node. In step 410, the recipient node whether internal manager 104, external agent 114 or another client, agent or node may compare the first protocol set with a second protocol set of the recipient node, to determine if a match may be found amongst available protocols.

If a match is found between the first protocol set and the second protocol set, processing may proceed to step 412 where a determination may be made whether more than one matching protocol has been found. If more than one matching protocol set has been found, processing may proceed to step 414 where one of the matching protocols may be selected for use based on protocol criteria, such as transfer speed, bit depth of keys or other security mechanisms, or other factors. Processing may then proceed to step 416, where a secure connection or session may be initiated between external agent 114 and the internal manager 104, based on the selected protocol. Likewise, if in step 412 only one matching protocol is found, processing may proceed to step 416 where a secure connection or session may be initiated. For instance, in embodiments specified ports may be opened under the TCP/IP or other communication or other protocols.

In step 418, a protocol-specific exchange may be initiated between the external agent 114 and internal manager 104, with handshaking and other steps proceeding according to the matching protocol employed. In step 420, either one of external agent 114 and internal manager 104 or both may authenticate the corresponding other node by transmitting the corresponding certificate 116 (of the external-agent 114) or certificate 108 (of the internal manager) to certificate authority 108, as appropriate. In embodiments, the certificate 116 or certificate 108 or other security data may be or include certificate objects conforming to the X.509 standard, or other standards or formats. With appropriate authentication complete, processing may proceed to step 422, in which a secure connection or session may be conducted between external agent 114 and internal manager 104. For instance, network or other rules may be communicated between the two nodes, for systems administration or other purposes.

When the secure session is complete, processing may proceed to step 424 where the secure connection between the external agent 114 and internal manager 104 may be terminated or released. In step 426, processing may terminate, repeat, return to a prior processing point or take other action. Likewise if no matching protocol may be identified in the determination of step 410, processing may proceed to step 426 to terminate, repeat, return to a prior processing point or take other action.

The foregoing description of the invention is illustrative, and modifications in. configuration and implementation will occur to persons skilled in the art. For instance, while the invention has generally been described in terms of a single external agent 114, in embodiments multiple external agents or nodes may be configured to automatically negotiate a matching protocol with internal manager 104 or other clients or nodes within security-enabled domain 102. Similarly, while an authentication mechanism has generally been described as being supported by a single authentication entity 110 using X.509 or other standards, in embodiments multiple authentication entities or other authentication or authorization platforms may be used.

Other hardware, software or other resources described as singular may in embodiments be distributed, and similarly in embodiments resources described as distributed may be combined.

Moreover, while instances in which one or the other of nodes or agents external to the security-enabled domain 102 and nodes or agents internal to that domain have been described at times as initiating the negotiation of a secure protocol, it will be understood that any node or agent configured according to the invention, external or internal to the domain, may initiate protocol processing. Likewise either one or both of internal and external agents may initiate authentication of the opposite agent or node. The scope of the invention is accordingly intended to be limited only by the following claims.

What is claimed is:

1. A method for automatically negotiating a security protocol, comprising:
   receiving a security authorization request to establish a secure connection between an internal node having a first protocol set and an external node having a second protocol set, wherein:
   (1) the internal node is within a security-enabled domain comprising a centralized distributed directory that maintains security information for a plurality of nodes; and
   (2) the external node is not included within the software-based, directory of nodes;
   comparing the first protocol set associated with the internal node to the second protocol set associated with the external node;

determining that the first node and the second node contain two or more security protocols in common;

selecting a preferred protocol from the two or more security protocols based on transfer speeds associated with the two or more security protocols, and bit depths of one or more encryption keys, wherein the transfer speeds refer to the speeds that network data can be transferred using the two or more security protocols;

the bit depths of one or more encryption keys include the number of bits constituting the one or more encryption keys;

and automatically establishing a secure connection between the external node and the internal node based on the preferred protocol.

2. A method according to claim 1, wherein the external node comprises at least one of a computer and a network-enabled wireless device.

3. A method according to claim 1, wherein the internal node comprises at least one of a client computer and a server.

4. A method according to claim 1, wherein the security-enabled domain comprises a distributed directory domain.

5. A method according to claim 1, wherein the security-enabled domain comprises a certificate-based domain.

6. A method according to claim 5, wherein the certificate-based domain comprises a Kerberos-enabled domain.

7. A method according to claim 6, wherein the matching protocol comprises an X.509 certificate.

8. A method according to claim 1, wherein the security authorization request is generated by the external node.

9. A method according to claim 8, wherein the selected protocol is determined based on at least one of a set of criteria, the set of criteria comprising a transfer speed and a bit depth of keys.

10. A method according to claim 1, wherein the security authorization request is generated by the internal node.

11. A method according to claim 10, wherein the step of receiving the security authorization request is executed by the external node.

12. A method according to claim 1, further comprising a step of terminating the secure connection when a session between the external node and the internal node is complete.

13. A method according to claim 1, further comprising a step of selecting a protocol to use in establishing the secure connection when a plurality of matching protocols are found.

14. A method according to claim 1, further comprising a step of authenticating at least one of the internal node and the external node.

15. A method according to claim 14, wherein the step of authenticating comprises communicating a certificate to a certificate authority.

16. A system for automatically negotiating a security protocol, comprising:

an internal node, the internal node being included within a software-based, distributed directory of nodes, the internal node configured to store a first protocol set comprising one or more security protocols supported by the internal node;

a negotiation engine, the negotiation engine configured for:

(1) receiving a security authorization request to establish a secure connection between the internal node having the first protocol set and an external node which is not included within the software-based, directory of nodes and being external to the security-enabled domain, the external node configured to store a second protocol set comprising security protocols supported by the external node, (2) comparing the first protocol set associated with the internal node to the second protocol set associated with the external node; (3) determining that the first protocol set and the second protocol set contain two or more security protocols in common, (4) selecting a preferred protocol from the two or more security protocols based on at least one of transfer speeds associated with the two or more security protocols and bit depths of one or more encryption keys, wherein:

a) the transfer speeds include the speeds that network data can be transferred using the two or more security protocols, and b) the bit depths of one or more encryption keys include the number of bits constituting the one or more encryption keys; and (6) automatically establishing a secure connection between the external node and the internal node based on the preferred protocol.

17. A system according to claim 16, wherein the external node comprises at least one of a computer and a network-enabled wireless device.

18. A system according to claim 16, wherein the selected protocol is determined based on at least one member of a set of criteria, the set of criteria comprising a transfer speed and a bit depth of keys.

19. A system according to claim 16, wherein the security-enabled domain comprises a distributed directory domain.

20. A system according to claim 16, wherein the security-enabled domain comprises a certificate-based domain.

21. A system according to claim 20, wherein the certificate-based domain comprises a Kerberos-enabled domain.

22. A system according to claim 21, wherein the matching protocol comprises an X.509 certificate.

23. A system according to claim 16, wherein the security authorization request is generated by the external node.

24. A system according to claim 23, wherein the security authorization request is received by the internal node.

25. A system according to claim 16, wherein the security authorization request is generated by the internal node.

26. A system according to claim 25, wherein the security authorization request is received by the external node.

27. A system according to claim 16, wherein the negotiation engine terminates the secure connection when a session between the external node and the internal node is complete.

28. A system according to claim 16, wherein the negotiation engine terminates connection processing when no match between the first protocol set and the second protocol set is found.

29. A system according to claim 16, wherein the negotiation engine selects a protocol to use in establishing the secure connection when a plurality of matching protocols are found.

30. A system according to claim 16, wherein at least one of the internal node and the external node authenticates the other.

31. A system according to claim 30, wherein the authenticating comprises communicating a certificate to a certificate authority.

32. One or more computer-readable storage medium having computer-executable instructions embodied thereon, the computer-executable instructions being configured to execute a method for automatically negotiating a security protocol, the method comprising:

receiving a security authorization request to establish a secure connection between an internal node within a security-enabled domain comprising a centralized distributed directory that maintains security information for a plurality of nodes, and an external node is not included within the software-based, directory of nodes; wherein:
(1) the internal node stores a first protocol set identifying one or more security protocols supported by the internal node, and
(2) the external node stores a second protocol set identifying security protocols supported by the external node;

comparing the first protocol set associated with the internal node to the second protocol set associated with the external node;

determining that the first protocol set and the second protocol set contain two or more security protocols in common;

selecting a preferred protocol from the two or more security protocols based on transfer speeds associated with the two or more security protocols, and bit depths of one or more encryption keys, wherein the transfer speeds refer to the speeds that network data can be transferred using the two or more security protocols; and the bit depths of one or more encryption keys include the number of bits constituting the one or more encryption keys;

automatically establishing a secure connection between the external node and the internal node based on the selected protocol.

33. The one or more computer-readable medium of claim 32, wherein the external node comprises at least one of a computer and a network-enabled wireless device.

34. The one or more computer-readable medium of claim 32, wherein the internal node comprises at least one of a client computer and a server.

35. The one or more computer-readable medium of claim 32, wherein the security-enabled domain comprises a distributed directory domain.

36. The one or more computer-readable medium of claim 32, wherein the security-enabled domain comprises a certificate-based domain.

37. The one or more computer-readable medium of claim 36, wherein the certificate-based domain comprises a Kerberos-enabled domain.

38. The one or more computer-readable medium of claim 37, wherein the matching protocol comprises an X.509 certificate.

39. The one or more computer-readable medium of claim 32, wherein the step of generating a security authorization request is executed by the external node.

40. The one or more computer-readable medium of claim 39, wherein the step of receiving the security authorization request is executed by the internal node.

41. The one or more computer-readable medium of claim 32, wherein the step of generating a security authorization request is executed by the internal node.

42. The one or more computer-readable medium of claim 41, wherein the step of receiving the security authorization request is executed by the external node.

43. The one or more computer-readable medium of claim 32, wherein the method further comprises a step of terminating the secure connection when a session between the external node and the internal node is complete.

44. The one or more computer-readable medium of claim 32, wherein the method further comprises a step of selecting a protocol to use in establishing the secure connection when a plurality of matching protocols are found.

* * * * *